United States Patent
Oasmaa et al.

(10) Patent No.: US 12,030,232 B2
(45) Date of Patent: Jul. 9, 2024

(54) METHOD OF CARRYING OUT THERMOLYSIS AND THERMOLYSIS APPARATUS

(71) Applicant: TEKNOLOGIAN TUTKIMUSKESKUS VTT OY, Espoo (FI)

(72) Inventors: Anja Oasmaa, Espoo (FI); Hannu Minkkinen, Tampere (FI); Christian Lindfors, Espoo (FI); Jani Lehto, Jyväskylä (FI); Juha Mannila, Tampere (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 888 days.

(21) Appl. No.: 16/975,558

(22) PCT Filed: Feb. 25, 2019

(86) PCT No.: PCT/FI2019/050152
§ 371 (c)(1),
(2) Date: Aug. 25, 2020

(87) PCT Pub. No.: WO2019/162577
PCT Pub. Date: Aug. 29, 2019

(65) Prior Publication Data
US 2020/0398475 A1    Dec. 24, 2020

(30) Foreign Application Priority Data
Feb. 26, 2018 (FI) .......................... 20185175

(51) Int. Cl.
C10B 47/44    (2006.01)
B29B 7/42    (2006.01)
(Continued)

(52) U.S. Cl.
CPC ............ B29C 48/681 (2019.02); B29B 7/422 (2013.01); B29B 7/425 (2013.01); B29B 7/72 (2013.01);
(Continued)

(58) Field of Classification Search
CPC ..... C10B 47/44; C10B 7/10; B29B 7/42–429; B29C 48/251–2519
See application file for complete search history.

(56) References Cited

U.S. PATENT DOCUMENTS 2,783,498 A * 3/1957 Richards ................. B29B 7/429
198/677
2,829,399 A * 4/1958 Caracciolo ............ B29C 48/686
264/102
(Continued)

FOREIGN PATENT DOCUMENTS

CN 201567310 9/2010
FI 20165640 2/2018
(Continued)

OTHER PUBLICATIONS

International Search Report for PCT/FI2019/050152, mailed May 31, 2019, 2 pages.
(Continued)

*Primary Examiner* — Jonathan Luke Pilcher
(74) *Attorney, Agent, or Firm* — Nixon & Vanderhye PC (57) ABSTRACT

A method and apparatus for thermolysing organic material. The method comprises steps of: A) feeding the material in a single-screw extruder (100), the extruder comprising —a cylindrical rotor member (1) having diameter (D) and length (L) and comprising a feeding zone (14), —the rotor member (1) arranged in a barrel (2), —the cylindrical surface of the rotor member (1) carrying cavity/cavities and/or projection(s) (5) arranged in helically extending rows, —the
(Continued)

helically extending row(s) of the rotor member (1) having a pitch (P) and depth (d) in the feeding zone (14) of the rotor member, wherein —the relation of the depth (d) to the diameter (D) of the rotor member, i.e. d:D, is not more than 1:20, and —the relation of the pitch (P) of the rotor member to the diameter (D) of the rotor member, i.e. P:D, is not more than 1:4, B) heating the material in the single-screw extruder (100) to a flowable state, and C) thermolysing the material.

28 Claims, 4 Drawing Sheets

(51) Int. Cl.
  *B29B 7/72* (2006.01)
  *B29B 7/82* (2006.01)
  *B29C 48/59* (2019.01)
  *B29C 48/68* (2019.01)
  *C10B 1/06* (2006.01)
  *C10B 7/10* (2006.01)
  *C10B 53/07* (2006.01)
  *B29B 7/92* (2006.01)

(52) U.S. Cl.
  CPC .............. *B29B 7/826* (2013.01); *B29C 48/59* (2019.02); *C10B 1/06* (2013.01); *C10B 7/10* (2013.01); *C10B 47/44* (2013.01); *C10B 53/07* (2013.01); *B29B 7/92* (2013.01)

(56) References Cited

U.S. PATENT DOCUMENTS

| | | | | |
|---|---|---|---|---|
| 4,098,649 A * | 7/1978 | Redker | ................... | C10B 7/10 201/2.5 |
| 4,308,103 A * | 12/1981 | Rotter | ................... | C10B 53/00 202/265 |
| 4,584,060 A * | 4/1986 | Winckler | ................... | C10B 7/10 201/35 |
| 5,411,714 A * | 5/1995 | Wu | ................... | C10B 53/07 110/255 |
| 5,490,725 A * | 2/1996 | Behrens | ................... | B29C 48/535 366/82 |
| 7,893,307 B2 * | 2/2011 | Smith | ................... | C10B 47/44 366/85 |
| 10,590,359 B2 * | 3/2020 | Felix | ................... | B29C 48/92 |
| 11,299,677 B2 * | 4/2022 | Ighofose | ................... | C10B 53/02 |
| 11,548,198 B2 * | 1/2023 | Minkkinen | ................... | B29C 48/681 |
| 2006/0143977 A1 * | 7/2006 | Meijer | ................... | C10B 47/44 44/629 |
| 2008/0202983 A1 * | 8/2008 | Smith | ................... | C10B 53/07 422/198 |
| 2014/0054815 A1 | 2/2014 | Houk et al. | | |
| 2015/0367532 A1 | 12/2015 | Pohl | | |
| 2022/0097014 A1 * | 3/2022 | Minkkinen | ................... | B29C 48/09 |

FOREIGN PATENT DOCUMENTS

| | | |
|---|---|---|
| GB | 1170430 | 11/1969 |
| JP | 2017-042993 | 3/2017 |
| WO | 97/37830 | 10/1997 |
| WO | 2018/037164 | 3/2018 |

OTHER PUBLICATIONS

Written Opinion of the ISA for PCT/FI2019/050152, mailed May 31, 2019, 6 pages.
Search Report for FI20185175, mailed Oct. 25, 2018, 2 pages.

* cited by examiner

METHOD OF CARRYING OUT THERMOLYSIS AND THERMOLYSIS APPARATUS

This application is the U.S. national phase of International Application No. PCT/FI2019/050152 filed 25 Feb. 2019, which designated the U.S. and claims priority to FI Patent Application No. 20185175 filed 26 Feb. 2018, the entire contents of each of which are hereby incorporated by reference.

BACKGROUND

The invention relates to a method for thermolysing organic material.

The invention further relates to a thermolysing apparatus.

It is known to use extruders in heating/melting material to be processed. The main challenge in the existing methods and apparatuses is a relatively small feeding zone opening area compared to volume flow and the challenges in effective heating of thermolysing material in conventional one screw extruders. Relatively small feeding zone opening area restricts the use of bigger dimension and fluffy feeding material in conventional extruders.

The challenges of effective heating of materials in thermolysis temperatures with conventional extruders are due to physical phenomena where the major of heating energy input is gained through the inner friction/viscosity of the processed material. However, as the temperature rises the inner friction/viscosity lowers and high temperatures needed in thermolysis cannot be reached in a techno-economically feasible way.

In this description, thermolysis means a chemical decomposition caused by heat.

In this description, pyrolysis means converting fuel in inert conditions and in high temperature into gaseous state, which forms oil-like, different organic compounds comprising liquid as it condensed. Inert conditions mean oxygen-free conditions where no combustion of the fuel occurs. In the pyrolysis process fuel is pyrolyzed, formed gaseous compounds, i.e. pyrolysis gases are separated from the char residue and the pyrolysis gases are condensed into pyrolysis oil. Pyrolysis oil may be used as fuel or refined into different chemicals.

In this description, organic material means any material comprising carbon-based natural or engineered compounds. Thus the organic material may comprise biomasses, for example wood, wood chips, peat, saw dust, firewood, forest residue, products and waste of the papermaking industry, lumber waste, urban wood waste, or other biomass; sludges, recycled fuels, and waste coals; agro fuels, such as straw, straw pellets, palm oil waste and any other waste produced in agricultural production. The organic material may comprise plastic material, such as thermoplastics or thermosets. The plastic material may be e.g. waste material and derived from side-streams of industry, trade or transportation. The organic material may also be composite material, e.g. wood-polymer composites or cardboards laminated or cast coated with plastic films.

BRIEF DESCRIPTION

Viewed from a first aspect, there can be provided a method for thermolysing organic material, the method comprising steps of:

A) feeding the material in a single-screw extruder, the extruder comprising
  a cylindrical rotor member having diameter D and length L and comprising a feeding zone,
  the rotor member arranged in a barrel,
  the cylindrical surface of the rotor member carrying cavity/cavities and/or projection(s) arranged in helically extending rows,
  the helically extending row(s) of the rotor member having a pitch P and depth d in the feeding zone of the rotor member, wherein
  the relation of the depth d to the diameter D of the rotor member, i.e. d: D, is not more than 1:20, and
  the relation of the pitch P of the rotor member to the diameter of the rotor member, i.e. P:D, is not more than 1:4, B) heating the material in the single-screw extruder to a flowable state, and C) thermolysing the material.

Thereby a method capable to process low bulk weight feed materials and continuously convey it through heating section may be achieved. Mixing capability and large area for heat transfer may enable thermolysis of more challenging feeding materials. Low bulk weight recycled conventional plastics, composites or biobased materials are possible to feed even without any preceding compacting steps.

Viewed from a further aspect, there can be provided a thermolysing apparatus, comprising a single-screw extruder, the single-screw extruder comprising
  a cylindrical rotor member having diameter D and length L and comprising a feeding zone,
  the rotor member arranged in a barrel,
  the cylindrical surface of the rotor member carrying cavity/cavities and/or projection(s) arranged in helically extending rows,
  the helically extending row(s) of the rotor member having a pitch P and depth d in the feeding zone of the rotor member, and the extruder further comprising
  a drive system for the rotation of the rotor member in the barrel, wherein
  the relation of the depth d to the diameter D of the rotor member, i.e. d:D, is not more than 1:20, and
  the relation of the pitch P of the rotor member to the diameter D of the rotor member, i.e. P:D, is not more than 1:4.

Thereby an apparatus capable to process low bulk weight feed materials and having large area for heat transfer that enables thermolysis of more challenging feeding materials may be achieved.

Furthermore, the heating of thermolysing material in the extruder is techno-economically notably more effective than with conventional extruders. This is caused by the fact that heat transfer can be effectively implemented from the barrel and from the rotor member side due to the large thermally conductive area thereof. Larger thermally conductive area enables also more controlled temperature even in fast thermolysis, thereby decreasing the possibility of local over heating and charring on rotor and stator surfaces.

Furthermore, because of the large diameter of the barrel, the inner surface of the barrel may be machined into favourable geometry with low cost contrary to conventional extruders. The favourable barrel surface geometry further enables more efficient and precise mixing of material and thereby faster and more precise tempering. Also due to the large diameter of the barrel, it is possible to utilize 3-D geometry in the barrel (additional to rotor). This may enable a more precise control of pressure gradient between zones of the extruder, which in turn may promote reject gas removal in desired temperature and/or zone. This enables the removal of halogen containing compounds already in extruder phase thus enabling the use of halogenated plastics as feeding material to thermolysis.

Finally, the possibility to use paper, cardboard and cellulose fiber containing polymer composites as extruder feeding materials multiplies the feed material flow from recycling compared to restriction to plastics.

The method and the apparatus are characterized by what is stated in the independent claims. Some other embodiments are characterized by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figures 1A, 1B:
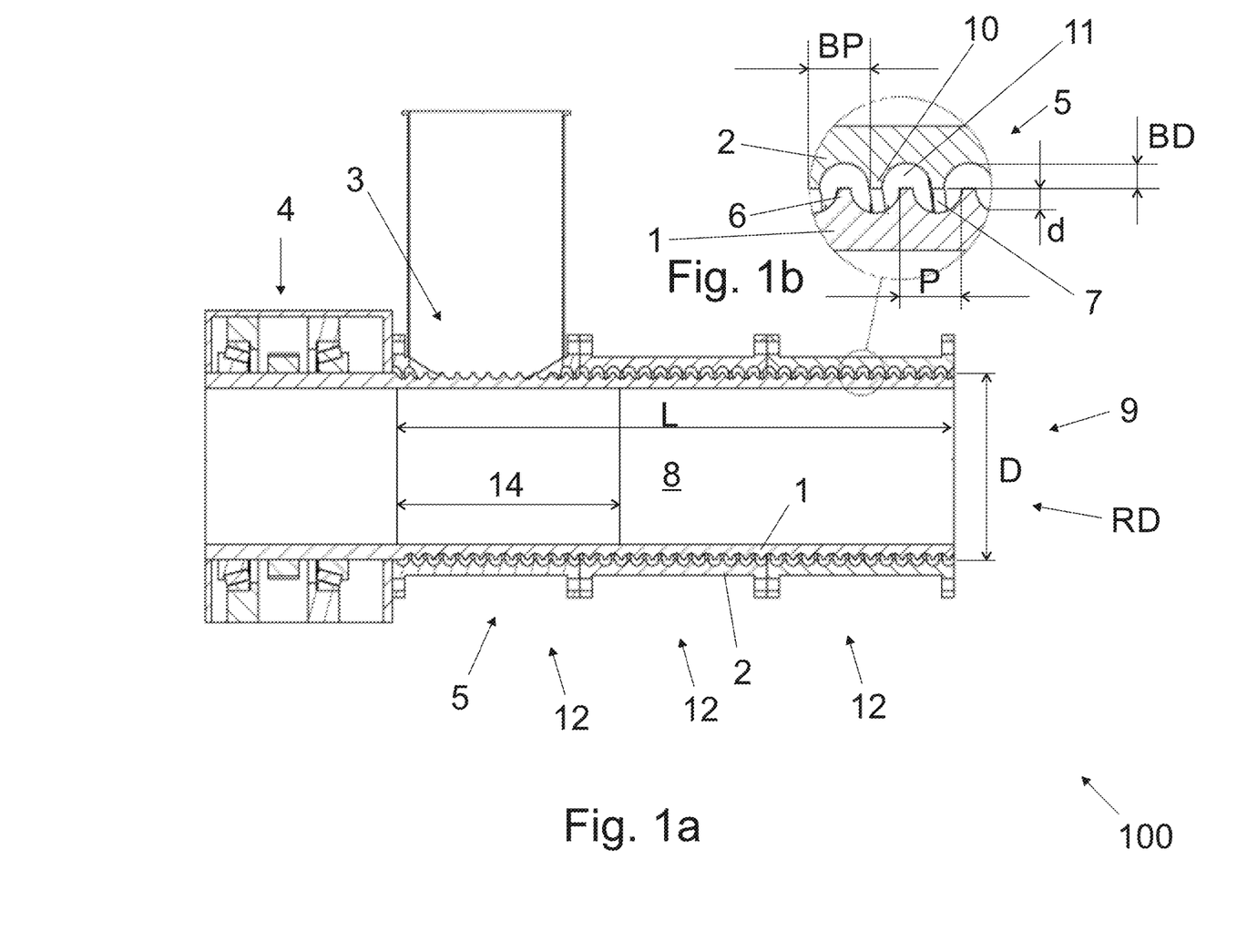
FIG. 1a is a schematic side view of an apparatus in partial cross-section.
FIG. 1b is a schematic view of a detail of the apparatus shown in FIG. 1a in partial cross-section.

FIG. 1a is a schematic side view of an apparatus in partial cross-section, and FIG. 1b is a schematic view of a detail of the apparatus shown in FIG. 1a in partial cross-section.

The apparatus is a single-screw extruder 100. The extruder 100 is preferably capable to process any kind of organic material (material hereafter) to be thermolysed, and it may also be used as pre-thermolyser. The form of the material does change when passing through the extruder, i.e. material or mixture of materials may, for instance, compress, compact, consolidate, grind, break apart, melt, react, decompose, and/or degrade.

The extruder 100 is a single-screw extruder comprising a cylindrical rotor member 1, a barrel 2, a feed opening 3, and a drive system 4 for the rotation of the rotor member 1 in the barrel 2.

The rotor member 1 has diameter D and length L. In an embodiment, the relation of the length to the diameter, i.e. L:D, is in range of 2:1 to 4:1.

The cylindrical outer surface of the rotor member 1 comprises projections 5 that realizes a screw thread comprising at least one screw flight 6 and at least one screw channel 7 between the at least one screw flight 6.

The screw thread constitutes a structure that transfers the material to be thermolysed in the barrel from the feed opening 3 towards the outlet 9 while the rotor member 1 is rotating in the barrel 2. In an embodiment, the profile of the screw thread is invariable. In another embodiment, the profile of the screw thread is variable such that the volume of the screw channel decreases towards the outlet 16 of the extruder. In an embodiment, the depth d of the cavity/cavities and/or projection(s) 5 arranged on the surface of rotor is arranged to decrease after feed zone (10).

The decreasing of the screw channel volume causes a compression ratio which is typically 1:2 to 1:4. The profile may change step by step, or it may comprise at least one section where the profile changes rapidly from one profile to another profile.

The screw flight 6 has pitch P and the screw channel 7 has depth d in the feeding zone 14 of the rotor member 1. The "feeding zone" means that part of the rotor member 1 that is directly under the feed opening 3 and one to five lap(s) of the flight 6 following the feed opening.

According to an aspect, the relation of the depth d to the diameter D, i.e. d:D, is not more than 1:20, and the relation of the pitch P to the diameter D, i.e. P:D, is not more than 1:4.

An advantage is that the volume of the screw channel 7 is very low compared to the screw diameter D. Thus it is possible to provide the extruder 100 with a very large feed opening 3 compared to the volume of the screw channel 7. Following this, light density and/or heterogeneous materials, such as materials comprising fibres, waste/recycled plastic, can be fed in the extruder 100 in amounts sufficient to fill optimally the screw channel 7. Thus there is no need, necessarily, for any preceding compacting steps.

Another advantage is that the low volume compared to the screw diameter D decreases power requirement of the extruder.

In an embodiment, d:D is in range of 1:300 to 1:20 (in the feeding zone 14 of the rotor member 1).

An advantage is that the temperature of the material to be processed in the screw channel 7 may be controlled very precisely due to large surface area of the screw channel compared to volume of the material, and thus e.g. materials or processes highly sensitive to temperature may be processed by the extruder. Further, the large surface area enables an efficient energy transfer from the rotor member and/or the barrel to the material.

In an embodiment, P:D is in range of 1:60 to 1:4.

An advantage is that the material to be processed may be transferred towards the outlet 7 by low power usage.

In an embodiment, the rotor member 1 realizes equation $CL \cdot d \leq RD \cdot 0.01$, wherein CL=CL=channel length measured in direction of length (L) of the rotor member 1, d=channel depth measured in radial direction of the rotor member 1, and RD=cross-sectional area of the rotor member, including also the cross-sectional area of the channel 8.

An advantage is that the volume of the screw channel 7 is very low compared to the screw diameter D, and thus easily filled with the material to be processed due to a large feed opening 3.

For instance, the diameter of the rotor member 1 may be 350 mm whereas the length following the feed opening is 400 mm.

In an embodiment, the feed opening 3 or the feeding zone 14 comprises shearing or cutting means for reducing the particle size of the material being fed in the extruder 100. This means may comprise e.g. cutting teeth arranged on the rotor member 1 and counterpart(s) arranged in the barrel 2.

According to an aspect, the rotor member 1 is hollow. In an embodiment, the rotor member comprises a cylindrical channel 8, such as circular cylinder, the diameter of which is at least 75%, preferably 80 to 85%, of the diameter D of the rotor member. This means that the diameter D of the rotor member may be increased compared to the known rotor members without increasing the weight and expenses thereof.

In an embodiment, the rotor member comprises one screw flight. In another embodiment, the rotor member comprises two, or even more, screw flights.

Thanks to the large diameter of the rotor member 1, the drive system 4 may be construed to transmit high torques in the rotor member 1. Also the structure of the rotor member 1 may stand high torques without risk for damages.

The extruder 100 may be realized many alternative ways. For instance, in an embodiment the rotor member 1 comprises helically extending rows of plurality of separate cavities, instead of the screw thread. Said cavities constitute a structure that transfers the material to be processed in the barrel from the feed opening 3 towards the outlet 9.

The shape of the cavities may be e.g. dome, hemispheric, a section or calotte of tear-drop, oval or combinations thereof.

According to an aspect, the relation of the depth d to the diameter D in the feeding zone 14 of the rotor member 1, i.e. d:D, is not more than 1:20, and the relation of the pitch P to the diameter D, i.e. P:D, is not more than 1:4.

An advantage is that the volume of the cavities is very low compared to the screw diameter D, and thus light density and/or heterogeneous materials, such as materials comprising fibres, waste/recycled plastic, can be fed in the extruder 100 in amounts sufficient to fill optimally the volume between the rotor member 1 and the barrel 2.

In an embodiment, d:D is in range of 1:300 to 1:20.

In an embodiment, P:D is in range of 1:60 to 1:4.

In another embodiment, the rotor member 1 comprises projections that realize helically extending rows of plurality of discrete projections, the row comprising pitch P.

According to an aspect, the relation of the depth d, or height of the projections, to the diameter D, i.e. d:D, is not more than 1:20, and the relation of the pitch P to the diameter D, i.e. P:D, is not more than 1:4.

In an embodiment, d:D is in range of 1:300 to 1:20.

In an embodiment, P:D is in range of 1:60 to 1:4.

According to an aspect, the cylindrical inner surface of the barrel 2 may comprise barrel cavity/cavities and/or projection(s). In an embodiment, said barrel cavity/cavities and/or projection(s) are arranged in helically extending rows. In another embodiment, the barrel cavity/cavities and/or projection(s) are arranged parallel with longitudinal axis of the rotor member 1. In still another embodiment, the barrel cavity/cavities and/or projection(s) are arranged perpendicular with the longitudinal axis of the rotor member 1.

Figure 2:
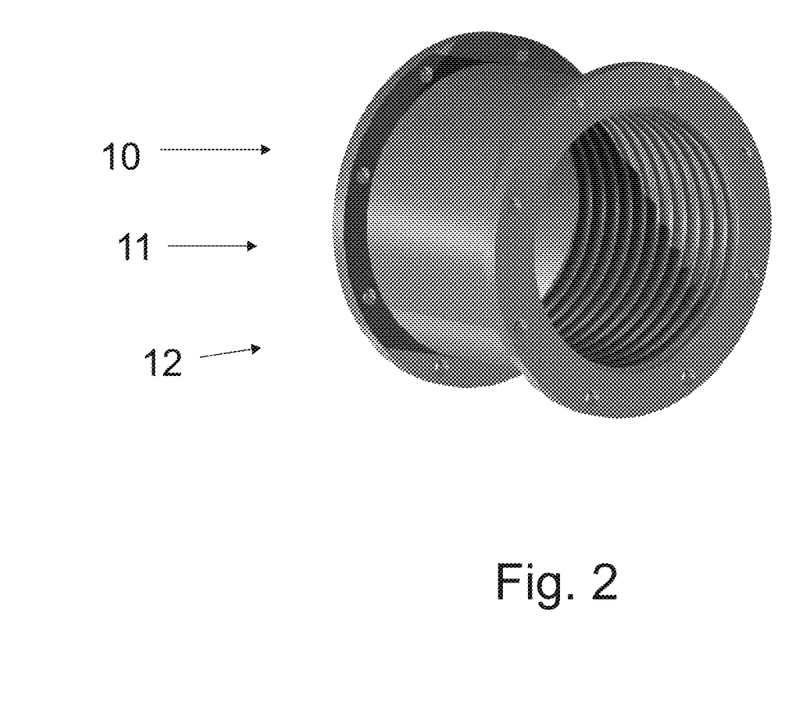
FIG. 2 is a schematic view of a piece of an extruder barrel.

In an embodiment, the barrel 2 comprises a barrel screw thread comprising at least one barrel flight 10 and at least one barrel channel 11 between the at least one flight, the barrel flight having a barrel pitch (BP) and the barrel channel having a barrel depth (BD).

An advantage is that transfer of the material to be processed towards the outlet 9 may be enhanced.

In another embodiment, the cavities arranged in the barrel 2 realize helically extending rows of plurality of separate cavities.

An advantage is that the mixing and blending properties of the extruder may be enhanced.

The cavities arranged in the barrel 2 may be invariable in their shape and size in all the length of the barrel they exist. In another embodiment, the barrel 2 may comprise variable sized and/or shaped cavities.

In an embodiment, the barrel cavity/cavities and/or projection(s) (5) are not continuous, such that there are several cavities or grooves side by side.

FIG. 2 is a schematic view of a piece of an extruder barrel. According to an aspect, the barrel 2 is construed from two or more barrel modules 12 that are separately manufactured and then connected consecutively.

An advantage is that the barrel cavity/cavities and/or projection(s), such as barrel screw thread comprising at least one barrel flight 10 and at least one barrel channel 11, may be manufactured in short pieces of the barrel more easily into short and large in diameter barrel module 12 than they would be manufactured in one monolithic barrel having equal length. It is to be noted, however, that the barrel 2 may also be manufactured in one piece. In the latter case, the barrel cavity/cavities and/or projection(s) can still be manufactured extremely easily due to high D:L relationship of the extruder.

Figure 3:
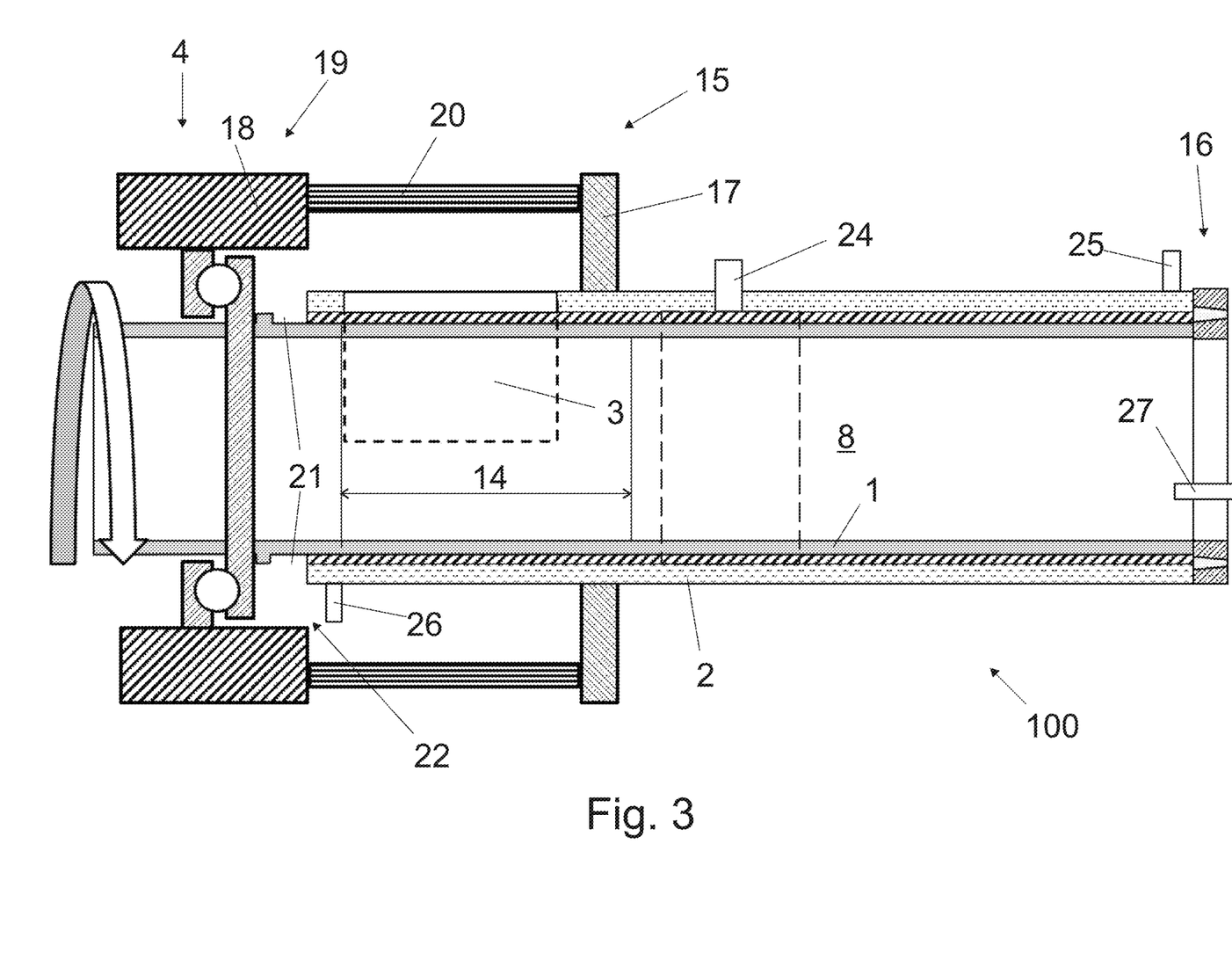
FIG. 3 is side view of another apparatus in partial cross-section, FIG. 4 a schematic illustration of a method for thermolysis, and FIG. 5 a schematic illustration of another method for thermolysis.

FIG. 3 is side view of another apparatus in partial cross-section. The feed opening 3 is substantially big comparing to the motor power and capacity of the extruder and the depth of the rotor cavities. The projected area of the feed opening could be 20 to 200 times the size of a feed opening of a conventional plastic single screw extruder with the same rotor motor power.

According to an aspect, the projected area of the feed opening is about 15 $cm^2$-150 $cm^2$ per kilowatt (kW) of rotor motor power, preferably about 30 $cm^2$-100 $cm^2$. In an embodiment, the projected area of the feed opening is about 50 $cm^2$/kW. In an embodiment, the feed opening 3 is cut to the halfway of the diameter of the barrel 2, i.e. approximately D/2. Thus the feed opening 3 potentially weakens the structure of the barrel 2 such an extent, that the barrel 2 is not able to carry the load caused during an extrusion process. Especially when the diameter of the barrel is large and the barrel is short, the axial forces tend to bend the barrel at the feeding zone 14.

In an embodiment, the barrel 2 is supported by a support structure 15 that lies outside of the barrel 2. The support structure 15 comprises a first support part 17 that is attached to a section of the barrel 2 between the feed opening 3 and the discharge end 16 of the barrel, a second support part 18 attached to the drive system side 19 of the extruder, and a load transmit structure 20 connecting the first support part 17 to the second support part 18. In the embodiment shown in FIG. 4, the second support part 18 has been fixed to a bearing housing 22 that covers the drive system 4. The load transmit structure 20 may be composed of one or more beam(s), plate structure or trussed construction, for instance.

The support structure 15 bears a part of the loads and stresses caused in an extrusion process and prevents the structure of the extruder from bending.

In an embodiment, there is an axial slot 21 arranged between the feeding zone 14 of the barrel and the bearing housing 22 of the extruder for receiving material (if any) flowing from the feeding zone backwards. Thus the axial slot 21 is to prevent the material to enter in the bearing housing 22. Instead, the material will drop through the slot in a room where it does not cause any problems to the extruder or the extrusion process.

In an embodiment, the barrel 2 is totally separated from the bearing housing 22, i.e. the axial slot 21 extends 360° around longitudinal axle of the extruder.

In another embodiment, there are plurality of axial slots 21 that are separated by short sections of material. The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

In an embodiment, the extruder 100 may comprise at least one gas-removing channel 24 for removing gas in the extruder 100. The gas removing channel 24 is arranged in the barrel 2 and connected to a gas-removing zone 23 arranged in the extruder 100.

In the gas-removing zone 23 there is such a geometry in the barrel and/or the rotor member that lowers the pressure of the material entering in the gas-removing zone 23. Due to this geometry, harmful gaseous components and/or remaining humidity of the material, if any, may be removed or at least reduced prior to thermolysis process. The large diameter of the barrel 2 makes it easier to manufacture the geometry needed in the gas-removing zone 23 than in known single-screw extruders.

This way halogenated, e.g. chlorine-containing gas(es) and/or bromine-containing gas(es), may be removed from the extruder 100. In an embodiment, one or more additive(s), such as calcium compound for chlorine-containing gas(es), are added in the material for promoting removal of the harmful components.

In an embodiment, the gas-removing zone 23 comprises barrel cavity/cavities 11 that have larger volume that the zones of the extruder before and after said gas-removing zone. According to another embodiment, the cavity/cavities having larger volume are arranged in the rotor member, or both in the barrel and the rotor member.

In an embodiment, the gas removing channel 24 may comprise a vacuum pump and a counter-extruder (not shown) being arranged to suck gaseous components out of the extruder 100 but, at the same time, prevent the mass outflow.

The extruder 100 can be heated through the rotor member 1 and/or barrel 2 in order to heat the material. The heating may be realised e.g. by electrical heating means or by using heat transfer medium, such as liquid or gas. The extruder shown in FIG. 3 is heated by heat transfer medium, and it comprises a barrel heating connection 25, a barrel heating discharge 26 and a rotor heating connection 27.

Figure 4:
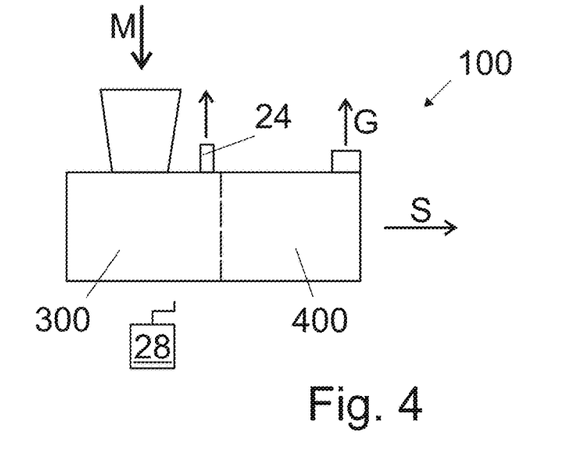

FIG. 4 a schematic illustration of a method for thermolysis. The method is a continuous process and comprises:
A) feeding the material in a single-screw extruder 100,
B) heating the material in the single-screw extruder 100 to a flowable state, and
C) thermolysing the material.

The features of the extruder 100 have been described above.

According to an aspect, the extruder 100 is used as a thermolysis reactor. In an embodiment, the extruder 100 constitutes a pyrolysis reactor for a pyrolysis process. The extruder 100 may be divided into a drying zone 300 and a pyrolysis zone 400 arranged successively.

The moisture and harmful gaseous matter, if any, separated from the material in the drying zone 300 will be removed from the extruder 100, and the dried material is further passed to the pyrolysis zone 400 for pyrolysis.

According to an aspect, the pyrolysis takes place in temperature between 200° C. to 700° C. The temperature depends on e.g. the material characteristics of the organic material.

The method and apparatus further uses a control system for controlling the process. The control system comprises a control unit 28 and sensors or analyzers (not shown). The control unit 28 comprises receiving means for receiving the measurement signals from the sensors and analyzers, calculating means for forming control signals and transmitting means for transmitting the formed control signals to the process. The calculating means comprise algorithms for conditioning the measurement signals and forming the control signals for controlling the process.

The pyrolysis creates pyrolysis gases G and solid residue S. These are removed continuous way from the extruder 100. The term "pyrolysis gases" refers to gases that are formed in pyrolysis and that will be condensated in a later process to form pyrolysis oil.

Figure 5:
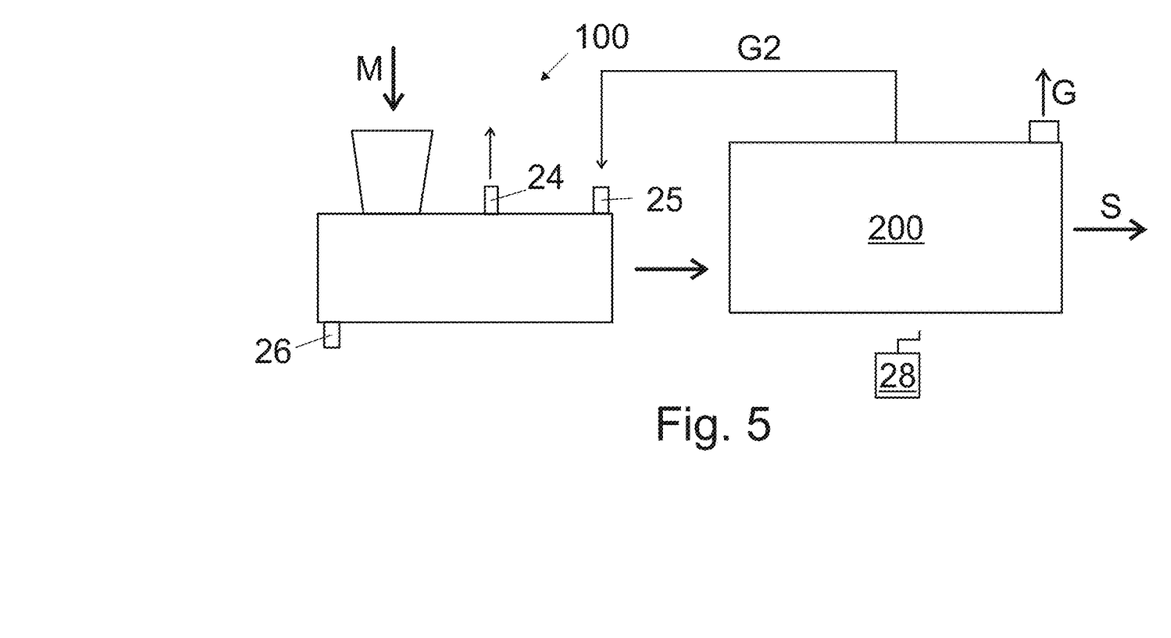

FIG. 5 a schematic illustration of another method for thermolysis. In an embodiment of the invention, the method comprises feeding the material in flowable state from the single-screw extruder 100 in a thermolysis reactor 200 separate from but connected to the extruder 100, and the thermolysis—such as pyrolysis—takes place in the thermolysis reactor 200. The extruder 100 may be used in drying the material and for removing harmful compounds from the material. Still further, the extruder 100 may heat, compress, compact, consolidate, grind, break apart, melt, react, decompose, and/or degrade the material into physical and chemical state that is advantageous for the thermolysis taking place in the thermolysis reactor 200.

The thermolysis reactor 200 may comprise e.g. a rotary kiln, a fluidized bed boiler or a screw thermolyser. These reactors are known as such, and therefore they are not described more detailed in this description.

In an embodiment, secondary gas G2 generated in the thermolysis process is used for heating the single-screw extruder 100 is shown in FIG. 5. An advantage is that the energy consumption of the method and apparatus may be lowered.

The drawings and the related description are only intended to illustrate the idea of the invention. The invention may vary in detail within the scope of the inventive idea defined in the following claims.

REFERENCE SYMBOLS 1 rotor member
2 barrel
3 feed opening
4 drive system
5 projection or cavity
6 screw flight
7 screw channel
8 channel
9 outlet
10 barrel flight
11 barrel channel
12 barrel module
13 hollow bar
14 feeding zone
15 barrel support structure
16 extruder outlet end
17 first support part
18 second support part
19 drive system side 20 load transmit structure
21 axial slot
22 bearing housing
23 gas-removing zone
24 gas-removing channel
25 barrel heating connection
26 barrel heating discharge
27 rotor heating connection
28 control unit
100 extruder
200 thermolysis reactor
300 drying zone
400 pyrolysis zone
BD barrel depth
BP barrel pitch
CL channel length
D diameter of the rotor member
d depth
G produced gas
G2 secondary gas
L length of the rotor member
M material
P pitch
RD cross-sectional area of the rotor member
S produced solid

The invention claimed is:
1. A method for thermolysing organic material, the method comprising:
A) feeding the material in a single-screw extruder, the extruder comprising
a cylindrical rotor member having diameter D and length L and comprising a feeding zone,
a feed opening, and
a drying zone and a pyrolysis zone,
the rotor member arranged in a barrel,
a cylindrical surface of the rotor member carrying cavity/cavities and/or projection(s) arranged in helically extending rows,
the helically extending row(s) of the rotor member having a pitch P and depth d in the feeding zone of the rotor member, wherein
the pitch of the helically extending rows is a distance between two consecutive helically extending rows,
the feeding zone comprises a part of the rotor member directly under the feed opening and five laps of the helically extending rows following the feed opening,
a relation of the depth d to the diameter D of the rotor member, i.e. d:D, is not more than 1:20, and
a relation of the pitch P of the rotor member to the diameter D of the rotor member, i.e. P:D, is not more than 1:4,
B) heating the material in the single-screw extruder to a flowable state, and
C) thermolysing the material, wherein the extruder is configured as a thermolysis reactor such that the thermolysis occurs in the single-screw extruder.
2. The method as claimed in claim 1, wherein said thermolysing comprises pyrolysis.
3. The method as claimed in claim 1, wherein the organic material comprises plastic waste.
4. The method as claimed in claim 1, comprising feeding the material in flowable state from the single-screw extruder.
5. The method as claimed in claim 4, further comprising using secondary gas generated in the thermolysis process for heating the single-screw extruder.
6. The method as claimed in claim 1, further comprising removing halogen-containing gas(es) from the extruder in the thermolysis.
7. The method as claimed in claim 6, wherein the removing halogen-containing gas(es) comprises adding an additive, for assisting in the removing of the removing halogen-containing gas(es).
8. The method as claimed in claim 1, further comprising adding a catalyst in the thermolysis for removing bromine-containing gas(es).
9. The method as claimed in claim 1, further comprising heating the organic material to a temperature of 200° C. to 700° ° C.
10. A thermolysing apparatus, comprising a single-screw extruder, comprising:
a cylindrical rotor member having diameter D and length L and comprising a feeding zone,
a feed opening;
the rotor member arranged in a barrel,
a cylindrical surface of the rotor member carrying cavity/cavities and/or projection(s) arranged in helically extending rows,
the helically extending rows of the rotor member having a pitch P and depth d in the feeding zone of the rotor member, wherein the pitch of the helically extending rows is a distance between two consecutive helically extending rows, and wherein the feeding zone comprises a part of the rotor member directly under the feed opening and five laps of the helically extending rows following the feed opening, and the extruder further comprising
a drive system for the rotation of the rotor member in the barrel,
wherein
a relation of the depth d to the diameter D of the rotor member, i.e. d:D, is not more than 1:20,
a relation of the pitch P of the rotor member to the diameter D of the rotor member, i.e. P:D, is not more than 1:4, and
the extruder is configured as a thermolysis reactor such that thermolysis occurs in the extruder; and
the extruder comprises a drying zone and a pyrolysis zone.
11. The apparatus as claimed in claim 10, wherein the cylindrical surface of the rotor member caries the projection(s),
the projection(s) of the rotor member comprise(s) a screw thread comprising at least one screw flight, and
at least one screw channel between the at least one screw flight, the screw flight having the pitch P and the screw channel having the depth d.
12. The apparatus as claimed in claim 10, wherein the cylindrical surface of the rotor member carries the cavity/cavities, and the cavity/cavities comprise(s) helically extending rows of a plurality of separate cavities.
13. The apparatus as claimed in claim 10, wherein the cylindrical surface of the rotor member caries the projection(s), and the projection(s) comprise(s) helically extending rows of a plurality of discrete projections.
14. The apparatus as claimed in claim 10, wherein the rotor member comprises a cylindrical channel, a diameter of which is at least 75% of the diameter D of the rotor member.
15. The apparatus as claim 10, wherein d:D is 1:300 to 1:20.
16. The apparatus as claimed in claim 10, wherein P:D is 1:60 to 1:4.

17. The apparatus as claimed in claim 10, wherein CL·d≤RD·0.01, wherein
CL=channel length measured in a direction of the length L of the rotor member,
d=the depth of the helically extending rows, and
RD=cross-sectional area of the rotor member.

18. The apparatus as claimed in claim 10, wherein the barrel comprises barrel cavity/cavities and/or projection(s) arranged in helically extending rows.

19. The apparatus as claimed in claim 18, wherein the barrel cavity/cavities and/or projection(s) realize a screw thread comprising at least one barrel flight and
at least one barrel channel between the at least one flight, the barrel flight having a barrel pitch BP and the barrel channel having a barrel depth BD.

20. The apparatus as claimed in claim 18, wherein the barrel cavities realize helically extending rows of a plurality of separate cavities.

21. The apparatus as claimed in claim 10, wherein L:D is 2:1 to 4:1.

22. The apparatus as claimed in claim 10, wherein the depth d of the helically extending rows in the feeding zone of the cavity/cavities and/or projection(s) arranged in the helically extending rows is arranged to decrease after the feeding zone.

23. The apparatus as claimed in claim 10, wherein a cross-sectional area of the feed opening is 15 cm²-150 cm² per kilowatt (kW) of rotor motor power.

24. The apparatus as claimed in claim 10, wherein the barrel comprises at least one gas-removing channel for removing gas in the extruder.

25. The apparatus as claimed in claim 24, wherein the gas-removing channel is connected to a gas-removing zone arranged in the extruder, and wherein the gas-removing zone comprises a barrel cavity/cavities having a larger volume than zones before and after said gas-removing zone.

26. The apparatus as claimed in claim 10, wherein the extruder comprises a connection for receiving gaseous heating medium for heating the barrel and/or the rotor member.

27. The apparatus as claimed in claim 10, wherein the barrel comprises a support structure being arranged outside of the barrel, the support structure comprising
a first support attached to the barrel between the feed opening and an extruder outlet end of the extruder,
a second support attached to a drive system side of the extruder, and
a load transmit structure connecting the first support to the second support.

28. The apparatus as claimed in claim 10, further comprising an axial slot arranged between the feeding zone of the barrel and a bearing housing of the extruder for receiving material flowing from the feeding zone backwards.

* * * * *